United States Patent [19]
Yamakawa

[11] Patent Number: 5,862,434
[45] Date of Patent: Jan. 19, 1999

[54] METHOD AND APPARATUS FOR FORMING AN IMAGE ON AN IMAGE TRANSFER MEDIUM AND A METHOD OF FORMING AN IMAGE USING THE IMAGE TRANSFER MEDIUM

[75] Inventor: Shinji Yamakawa, Kawasaki, Japan

[73] Assignee: Ricoh Company, Ltd., Tokyo, Japan

[21] Appl. No.: 804,642

[22] Filed: Feb. 25, 1997

[30] Foreign Application Priority Data

Feb. 29, 1996 [JP] Japan .................................... 8-071484

[51] Int. Cl.⁶ .................................................... G03G 15/01
[52] U.S. Cl. .......................... 399/54; 399/223; 399/302; 430/120
[58] Field of Search ............................. 399/223, 54, 302; 430/43, 45, 120

[56] References Cited

U.S. PATENT DOCUMENTS

| | | | |
|---|---|---|---|
| 5,065,233 | 11/1991 | Oka | 399/54 X |
| 5,260,753 | 11/1993 | Haneda et al. | 399/54 |

FOREIGN PATENT DOCUMENTS

| | | |
|---|---|---|
| 1-142663 | 6/1989 | Japan . |
| 6-186787 | 7/1994 | Japan . |
| 7-114241 | 5/1995 | Japan . |

*Primary Examiner*—Arthur T. Grimley
*Assistant Examiner*—Sophia S. Chen
*Attorney, Agent, or Firm*—Oblon, Spivak, McClelland, Maier & Neustadt, P.C.

[57] ABSTRACT

A system of forming an image on an image transfer medium. The system forms an image according to image data on the image transfer medium and forms one color primer image on the image transfer medium at least in an area of the image. The system forms the image using the transfer medium and can separate the image according to the image data and the primer image from the image transfer medium, and fix the separated image according to the image data and the primer image on a surface of a transferred object by contacting the primer image with a surface of the transferred object. In this system, an expected color image can be obtained even if a transferred object color is not white, because the primer image is formed between the image and the surface of the transferred object.

28 Claims, 8 Drawing Sheets

INTERMEDIATE TRANSFER BELT

IMAGE TRANSFER PAPER

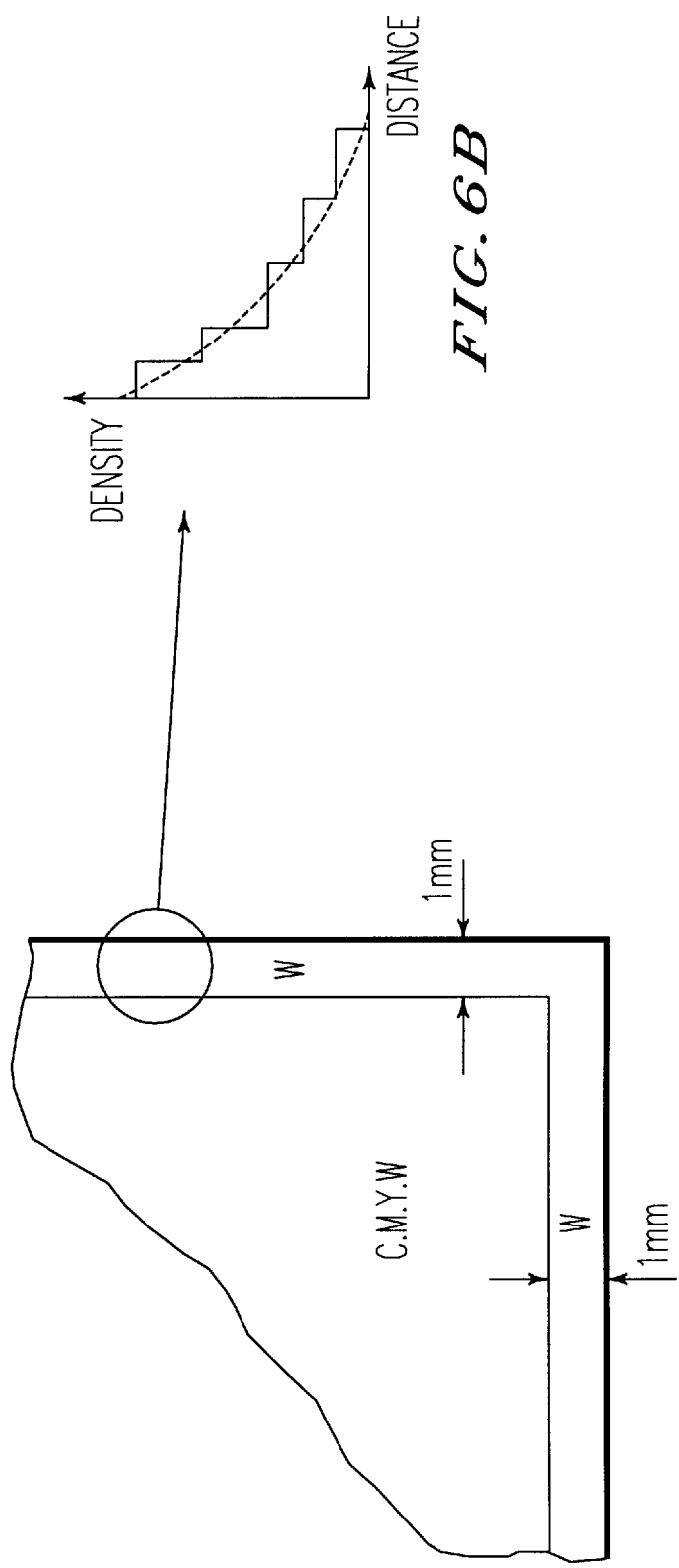

METHOD AND APPARATUS FOR FORMING AN IMAGE ON AN IMAGE TRANSFER MEDIUM AND A METHOD OF FORMING AN IMAGE USING THE IMAGE TRANSFER MEDIUM

BACKGROUND OF THE INVENTION

1. Field of the Invention

This invention relates to an image forming apparatus and method of forming an image on a transfer medium, and a method and apparatus for image forming using the transfer medium.

2. Discussion of the Background

A method of image forming with an image transfer paper is known as a method of forming an image on a ceramic product, enamel product or glass product.

FIGS. 7A–7F show a method of image forming with an image transfer paper. In FIG. 7A, first an image is formed on an image transfer paper 900. By the following steps, the image on the transfer paper 900 is transferred to a ceramic product 905. The image transfer paper 900 includes a base paper 901 and a water-soluble paste layer 902 formed on the base paper 901.

As shown in FIG. 7B, in a first step, an ink image 903 is printed on the image transfer paper 900 by a screen printing method. Next, as shown in FIG. 7C, resins are provided on the water-soluble paste layer 902 and the printed image 903, and thus a resin layer 904 is formed, whereby an image transfer paper is fabricated.

In a next step as shown in FIG. 7D, the thus fabricated image transfer paper is inserted into water. The water-soluble paste layer 902 is thereby dissolved in the water, so that the base paper 901 is peeled off, whereby a separate resin layer 904 which bears an image 903 is obtained.

In a next step as shown in FIG. 7E, the thus obtained separated resin layer 904 is applied to the surface of a ceramic product 905. Next, the ceramic product 905 with the resin layer 904 is burned, whereby an image bearing ceramic product can be obtained, as shown in FIG. 7F.

In this method, an image is printed by a screen printing method. In a screen printing, a printing plate is required to be made. Since a basic printing mode of the screen printing is multi-color printing, 10 or more kinds of printing plates are usually required to obtain colorful images. Therefore, the cost for making such printing plates is high. Accordingly, the screen printing method is only used for manufacturing a small number of products.

Japanese Laid-Open Applications 4-135798 and 7-199540 propose a method of solving the above-mentioned problem in the screen printing method. As disclosed in these applications, a toner image is formed on a transfer paper 900 by a dry type copying machine, whereby a toner image bearing image transfer paper is prepared. The thus prepared toner image bearing a resin layer 904 is applied to the surface of the ceramic product 905. Then, the ceramic product 905 with the resin layer 904 is burned, whereby an image bearing ceramic product can be obtained.

This method, however, has a problem. A typical dry type copying machine is made for printing an image on white paper as a recording paper. Further, the toner which forms an image has some translucence. Therefore, in a typical dry type copying machine, a density of each color toner is made based on a decision of printing on white paper and the toner has some translucence. Moreover, a white color and near white color in a forming image is made by using the white color in a recording paper.

However, in the above method of an image forming on a ceramic product using an image transfer paper, because a color of a surface of many ceramic products is not white, an expected color cannot be obtained. This problem occurs in the case of not only forming an image on a ceramic product but also in forming an image on clothing, for example, a T-shirt.

SUMMARY OF THE INVENTION

Accordingly, it is an object of the present invention to provide a novel method of forming an image on an image transfer medium for obtaining an expected color image.

It is a further object of the present invention to provide a novel method of forming an image using the transfer medium for obtaining an expected color image.

It is a further object of the invention to provide a novel image forming apparatus for forming an image on an image transfer medium for obtaining an expected color image.

The novel method of forming an image on an image transfer medium may include forming an image according to image data on the image transfer medium and forming one color primer image on the image transfer medium at least in the area of the image according to the image data.

The novel method of forming an image using the transfer medium may include forming an image according to image data on the image transfer medium, forming a primer image on the image transfer medium at least in the area of the image according to the image data, separating the image according to the image data and the primer image, and fixing the image according to the image data and the primer image on a surface of a transferred object as contacting the primer image with the surface of a transferred object.

The novel image forming apparatus for forming an image on an image transfer medium may also include an input for inputting image data, an image processor for generating one color primer image data at least in the area of the input image data, an image forming unit for forming an image on the image transfer medium according to the input image data and a unit for forming a primer image on the image transfer medium according to the primer image data from the image processor means.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings wherein:

FIGS. 6A and 6B show an application of the embodiment in FIGS. 5A, 5B and 5C.

DESCRIPTION OF THE PREFERRED EMBODIMENTS

Figure 1:
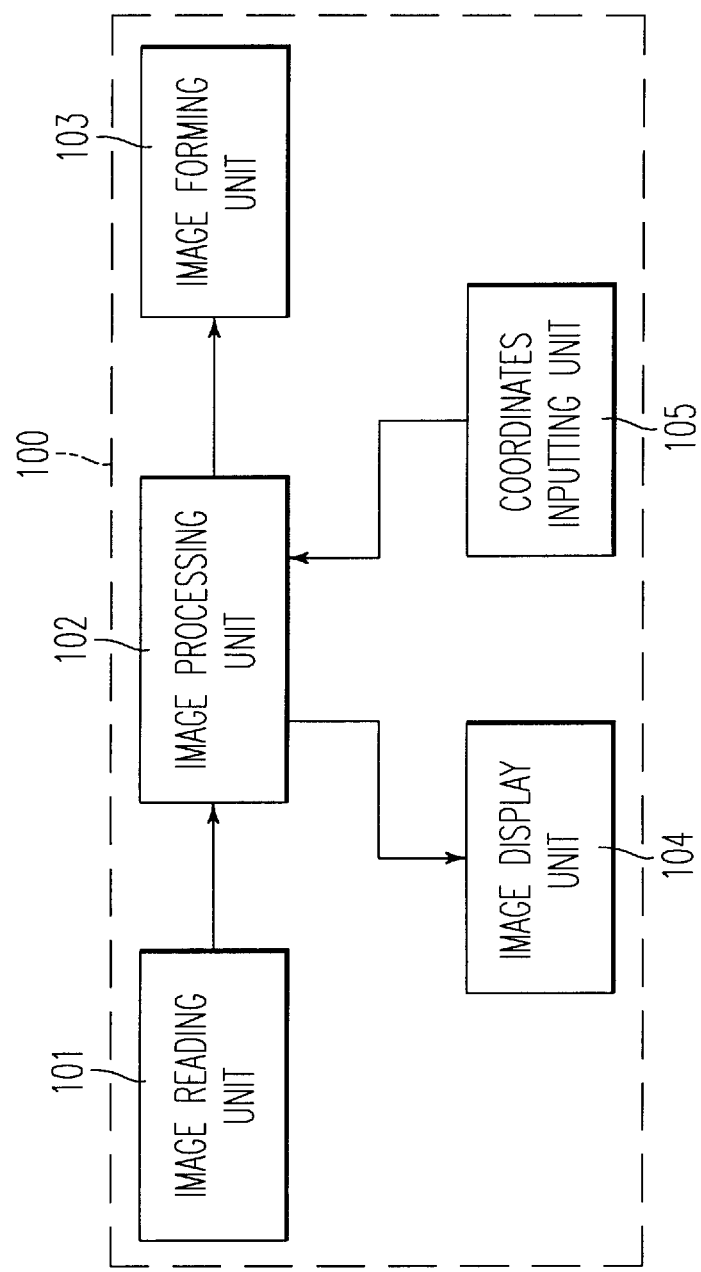
FIG. 1 is a block diagram of a digital copier according to an embodiment of the present invention.

Referring now to the drawings, wherein like reference numerals designate identical or corresponding parts throughout the several views, a first embodiment of the present invention is shown in FIG. 1.

FIG. 1 is a block diagram of a digital copier 100 according to an embodiment of present invention. The digital copier 100 includes an image reading unit 101, an image processing unit 102, an image forming unit 103, an image display unit 104 and a coordinates inputting unit 105. The image reading unit 101 reads an original document by optical scanning, and converts read optical information of the original document to a digital image signal which is output to the image processing unit 102.

The image processing unit 102 carries out an image processing to the input image signal of the original document, for example color converting. The image display unit 104 displays an image according to an image signal sent from the image processing unit 102. The coordinates inputting unit 105 allows an operator to input coordinates for designation of an area of the original document.

The image forming unit 103 forms a color image on a transfer paper according to an image signal from the image processing unit 102 by an electrophotographic process.

Figure 2A:
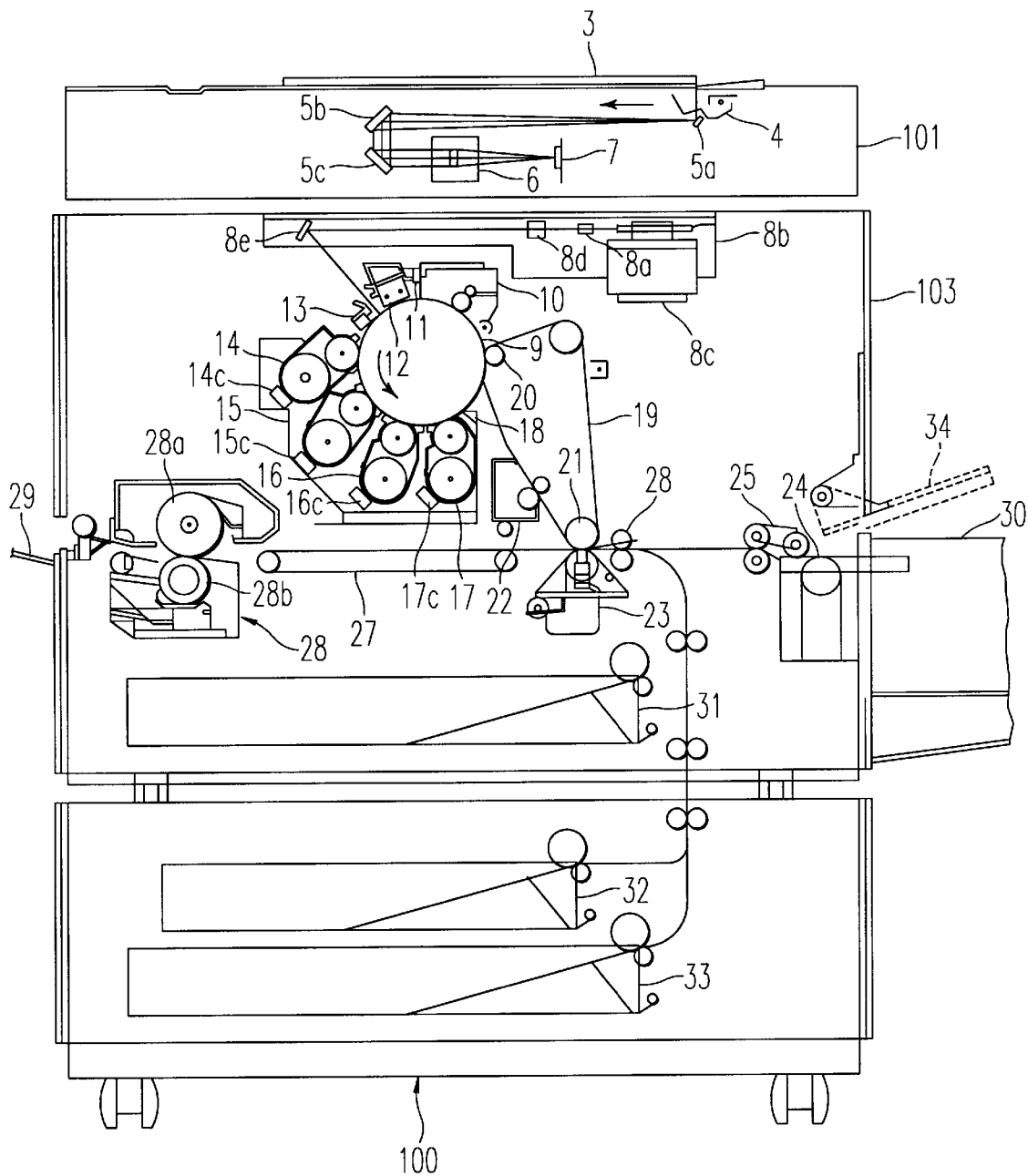
FIGS. 2A and 2B are diagrams of section views of the digital copier according to the embodiment of the present invention.

Referring to FIG. 2A, an image forming apparatus embodying the present invention is shown and implemented as a color copier by way of example. As shown, the color copier includes the image reading unit 101 which includes a lamp 4. As the lamp 4 illuminates an original document 3 to be copied, the resulting reflection from the document 3 is focused onto a color image sensor 7 via mirrors 5a, 5b and 5c and a lens 6. The image sensor 7 reads the incident imagewise light in the form of, for example, blue (B), green (G) and red (R) color components and converts the read light to corresponding electric signals. The image processing unit 102 processes the B, G and R image data on the basis of their intensity levels so as to produce cyan (C), magenta (M) and yellow (Y) color image data. The image processing unit 102 also produces white (W) image data. The image forming unit 103 prints out the color image data in C, M, Y and W one above another, thereby forming a full-color image.

Figure 2B:
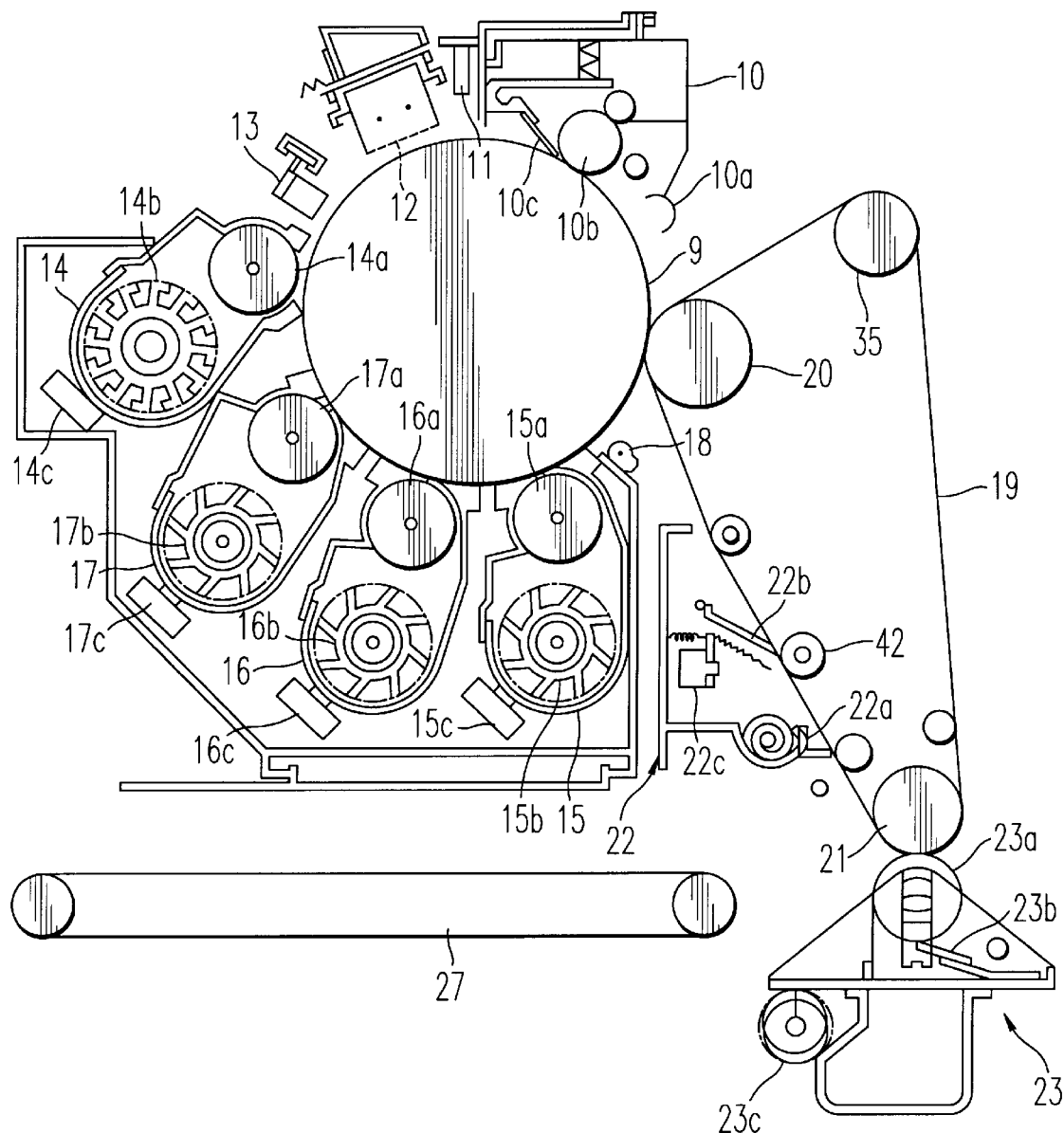

As shown in FIG. 2A, the color image data from the image reading unit 101 is applied to an optical unit, or optics 8. The optics 8 transforms the color image data to an optical signal and writes the image data on a photoconductive drum 9 with an optical signal, see FIG. 2B which shows the image forming unit 103 in greater detail. As a result, a latent image is electrostatically formed on the drum 9. The optics 8 includes a laser unit 8a, a rotatable polygonal mirror 8b, a motor 8c for rotating the rotatable mirror 8b, a lens 8d, and a mirror 8e. The drum 9 is rotatable counterclockwise, as indicated by an arrow in FIG. 2A.

Arranged around the drum 9 are a cleaning unit 10 (including a precleaning discharger 10a) for cleaning the drum 9, a discharge lamp 11, a charger 12, a potential sensor 13, a C developing unit 14, a M developing unit 15, an Y developing unit 16, a W developing unit 17, a photosensor 18 responsive to a development density pattern, and an intermediate image transfer unit 19, for example an intermediate transfer belt. The developing units 14–17 respectively have developing sleeves 14a, 15a, 16a and 17a, paddles 14b, 15b, 16b and 17b, and toner concentration sensors 14c, 15c, 16c and 17c. The sleeves 14a–17a are each rotatable while holding a respective developer deposited thereon in contact with the drum 9. The paddles 14b–17b are each rotatable to scoop up and agitate the associated developer.

The operation of the digital copier will now be described on the assumption that the digital copier sequentially forms C, M, Y and W images in this order by way of example. At first, when the digital copier is in a stand-by condition, all the developing units 14–17 are held inoperative, e.g., developers on the sleeves 14a–17a are held in their inoperative condition. On the start of a copying operation, the image reading unit 101 begins to read C image data at a predetermined timing. The C image data is written to the drum 9 by a laser beam to form a corresponding electrostatic latent image. The latent image derived from the C image data will be referred to as a C latent image hereinafter. This is also true with latent images associated with M and Y image data. A W latent image data is formed according to the W image data produced by the image processing unit 102. The sleeve 14a of the C developing unit 14 starts rotating before the leading edge of the C latent image reaches the C developing position of the C developing unit 14, thereby bringing a C developer, or toner, deposited thereon to an operative position. As a result, the C latent image is developed by the C toner to produce a corresponding toner image on drum 9. As soon as the trailing edge of the C latent image moves away from the C developing position, the C developer is brought to an inoperative position. This operation is completed at least before the leading edge of a M latent image, which is a next latent image, arrives at the C developing position. To render the C developer inoperative, the sleeve 14a may be rotated in the opposite direction to the direction in which it is rotated during development. Alternatively, only the sleeve 14a or the whole developing unit 14 may be moved away from the drum 9.

The C toner image formed on the drum 9 is transferred to the intermediate transfer belt 19 which is rotating at the same speed as the drum 9. The image transfer from the drum 9 to the belt 19 will hereinafter be referred to as belt transfer for simplicity. For the belt transfer, a predetermined bias voltage is applied to a transfer bias roller 20 while the drum 9 and belt 19 are held in contact. In this manner, the C, M, Y and W toner images sequentially formed on the drum 9 are transferred to the belt 19 one above another to form a four-color image. The four-color image is then collectively transferred from the belt 19 to an image transfer medium 24. The intermediate image transfer unit including the belt 19 will be described in greater detail later.

After the C image forming process described above is completed, the image reading unit 101 starts reading M image data at a predetermined timing with the result that a M latent image is formed on the drum 9 by a laser beam. After the trailing edge of the C latent image has moved away from the M developing position of the M developing unit 15, and before the leading edge of the M latent image arrives at the M developing position, the sleeve 15a of the unit 15 starts rotating to bring the M developer, or toner, to an operative position. As a result, the M latent image is developed by the M developer to produce a corresponding toner image on the drum 9. As the trailing edge of the M latent image moves away from the M developing position, the M developing unit 15 on the sleeve 15a is brought to an inoperative position like the previously stated C developing unit 14. This operation is also completed before the leading edge of a Y latent image, which is the next latent image, arrives at the M developing position. The Y latent image and the W latent image are then formed on the drum 9 and developed by respective developers in the same manner as these C and M latent images.

In the intermediate image transfer unit, the belt 19 is passed over a drive roller 21 and a plurality of driven rollers (represented by rollers 35 and 42) as well as over the bias roller 20. A motor controllably moves the belt 19, as will be described specifically later. A belt cleaning unit 22 is provided for cleaning the belt 19 and includes an inlet seal 22a, a rubber blade 22b, and a mechanism 22c for moving the inlet seal 22a and rubber blade 22b into and out of contact with the belt 19. The mechanism 22c maintains the inlet seal 22a and rubber blade 22b spaced apart from the belt 19 when the belt transfer of the second, third and fourth images is under way after the belt transfer of the first image, i.e., the C image.

A paper transfer unit 23 has a bias roller 23a, a roller cleaning blade 23b and a mechanism 23c for moving the bias roller 23a into and out of contact with the belt 19. Usually, the mechanism 23c maintains the bias roller 23a spaced apart from the belt 19. However, when the four-color image is to be transferred from the belt 19 to the image transfer paper 24, the mechanism 23c presses the bias roller 23a against the belt 19 with the intermediary of the image transfer paper 24. At this instant, a predetermined bias voltage is applied to the bias roller 23a. The image transfer paper 24 is fed by a pick-up roller 25 and a registration roller 26 such that the leading edge thereof meets the leading edge of the four-color image on the belt 19 at an image transfer position.

Three different systems (A)–(C) are available for driving the belt 19 after the first or C toner image has been fully transferred to the belt 19, as follows. Any one of such systems may be used alone, or some of them may be combine in matching relation to a copy size from the copying speed standpoint.

A) A Constant Speed Forward System, which has the following operations:

(1) Even after the belt transfer of the C toner image, the belt 19 is driven forward at the same speed.

(2) A M toner image is formed on the drum 9 such that the leading edge thereof arrives at a belt transfer position, where the belt 19 contacts the drum 9, just when the leading edge of the C toner image on the belt 19 reaches the belt transfer position again.. As a result, the M image is transferred to the belt 19 in accurate register with the C image.

(3) This is followed by Y and W image forming steps to complete a four-color image on the belt 19.

(4) After the belt transfer of the fourth or W toner image, the belt 19 is continuously moved forward to transfer the composite color image to the image transfer paper 24.

B) A Skip Forward System, which has the following operations:

(1) After the belt transfer of the C toner image, the belt 19 is moved away from the drum 9, the belt 19 skips forward at high speed, and is then restored to the initial speed on moving a predetermined distance, and is again brought into contact with the belt 19.

(2) A toner image is formed on the drum 9 such that the leading edge thereof arrives at the belt transfer position just when the leading edge of the C toner image on the belt 19 reaches the belt transfer position again. As a result, the M image is transferred to the belt 19 in accurate register with the C image.

(3) This is followed by Y and W image forming steps to complete a four-color image on the belt 19.

(4) After the belt transfer of the fourth or W toner image, the belt 19 is continuously moved forward to transfer the composite color image to the image transfer paper 24.

C) A Back-And-Forth (Quick Return) System, which has the following operations:

(1) After the belt transfer of the C toner image, the belt 19 is moved away from the drum 9, brought to a stop, and then returned in the opposite direction at high speed such that the C image on the belt 19 runs by the belt transfer position in the opposite direction. Then, the belt 19 is brought to a stop on moving a predetermined distance.

(2) When the leading edge of a M toner image formed on the drum 9 reaches a predetermined position short of the belt transfer position, the belt 19 is again moved forward and brought into contact with the drum 9. The M image is transferred from the drum 9 to the belt 19 in accurate register with the C image.

(3) This is followed by Y and W image forming steps to complete a four-color image on the belt 19.

(4) After the belt transfer of the fourth or W toner image, the belt 19 is moved forward without being returned to transfer the composite color image to the image transfer paper 24.

After the composite color image has been transferred from the belt 19 to the image transfer paper 24 by any of the above systems (A)–(C), the image transfer paper 24 is conveyed to a fixing unit 28 by a transport unit 27. The fixing unit 28 fixes the toner image on the image transfer paper 24 with a heat roller 28a, which is controlled to a predetermined temperature, and a press roller 28b. Finally, the image transfer paper sheet 24 with the fixed toner image is driven out to a copy tray 29 as a full-color copy.

After such belt transfer, the drum cleaning unit 10, i.e., a cleaning roller 10b and a cleaning blade 10c, clean the surface of the drum 9. The discharge lamp 11 uniformly discharges the surface of the drum 9. Moreover, the cleaning unit 22 has the rubber blade 22b thereof pressed against the belt 19 by the mechanism 22c, thereby cleaning the surface of the belt 19.

Paper cassettes 30, 31, 32 and 33 are each loaded with transfer paper sheets of respective particular sizes. When a desired paper size is entered on an operation panel, the selected transfer paper sheets are sequentially fed from a designate done of the cassettes 30–33 toward the register roller 26. The reference numeral 34 designates a tray for allowing relatively thick sheets to be fed by hand.

The copier machine just described can print on an ordinary recording paper and OHP (over head projector) also.

Figure 3:
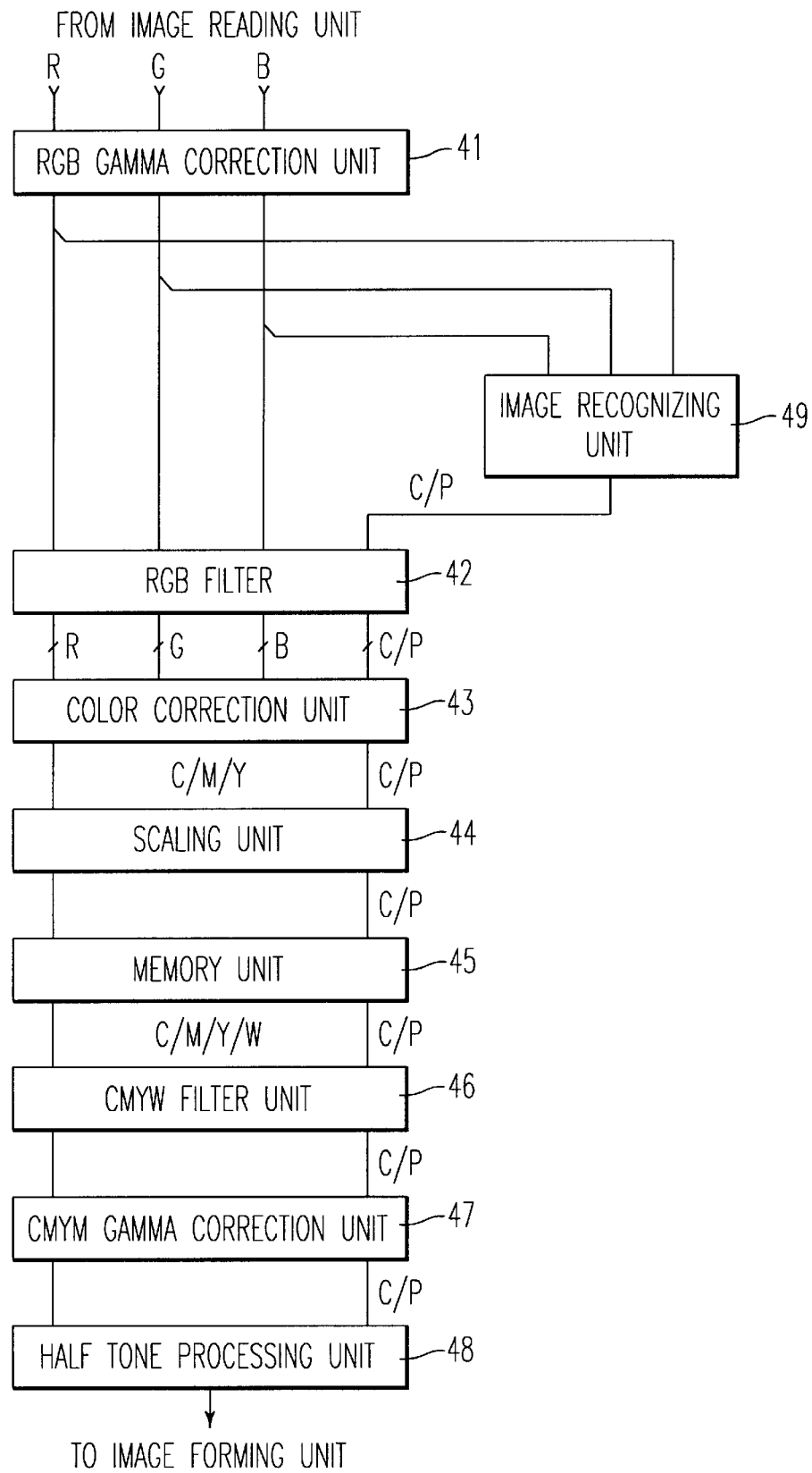
FIG. 3 is a block diagram of an image processing unit of the digital copier according to the embodiment of present invention.

FIG. 3 is a block diagram of the image processing unit 102. The image signals R, G and B from the image reading unit 101 are input to a RGB gamma correction unit 41. The RGB gamma correction unit 41 corrects RGB gamma characteristics of the input image signals, for example according to a LUT (look up table) which is stored in a memory, and outputs corrected signals.

The image signals R, G and B which are output from the RGB gamma correction unit 41 are input to an image recognizing unit 49 and an RGB filter 42. The image recognizing unit 49 distinguishes whether an input image signal is a character image or a picture image and outputs the result of the distinguishing as a C/P (character/picture) signal. This C/P signal is sent to a color correction unit 43, a scaling unit 44, a memory unit 45, a CMYW filter unit 46, a CMYW gamma correction unit 47 and a half tone processing unit 48 for processing in each unit according to the kind of input image signal, i.e., whether the input image is a character image or a picture image.

Moreover, the RGB filter unit 42 carries out processing of an edge enhancement or smoothing for the input image signals R, G and B according to the C/P signal from the image recognizing unit 49. When the C/P signal shows that an input image signal is a character image, edge enhancement is carried out, and when the C/P signal shows that an input image signal is a picture image, smoothing is carried out. These edge enhancement and smoothing operations are carried out by RGB filter unit 42 being a smart filter.

The image signals R, G and B from the RGB filter unit 42 are input to the color correction unit 43. In the color correction unit 43, the input R, G and B image signals are converted to C, M and Y signals which correspond to the toner colors for image forming by matrix computing with a first-degree equation of masking.

The image signals C, M and Y from the color correction unit 43 are input to the scaling unit 44. The scaling unit 44 carries out scaling of the input image signals about a direction of a main scanning as necessary.

The image signals C, M and Y from the scaling unit 44 are input to the memory unit 45. The memory unit 45 includes an image memory of at least one page. The image signals C, M and Y are expanded in the image memory in the memory unit 45 as bit-map image data by each color. Moreover, a W image, which is a primer image, is also expanded in the image memory as bit-map image data.

The image data from the memory unit 45 is input to the CMYW filter 46. The CMYW filter 46 carries out processing of an edge enhancement or smoothing for input bit-map data according to the character of the photoconductive drum 9 and other units. The edge enhancement and smoothing is carried out by CMYW filter 46 being a smart filter.

The image data from the CMYW filter 46 is input to the CMYW gamma correction unit 47. The CMYW gamma correction unit 47 corrects CMYW gamma characteristics of the input image data, for example according to a LUT (look up table) which is stored in a memory and selected according to the C/P signal.

The image data from CMYW gamma correction unit 47 is input to the half tone processing unit 48. The half tone processing unit 48 fits the image data from the CMYW gamma correcting unit 47 into data which can be formed by the image forming unit 103. For example, when the number of levels of half tone which can be formed by the image forming unit 103 is smaller than the number of levels of half tone data output from the CMYW gamma correction unit 47, the half tone processing unit 48 converts the image data from CMYW gamma correction unit 47 to image data which has the smaller number of levels of half tone for forming by the image forming unit 103 with a quantization, for example a dither matrix processing.

The image data output from the half tone processing unit 48 is sent to the image forming unit 103, and in the image forming unit 103 the latent image of each color C, M, Y and W is formed on the photoconductive drum 9, as described above. Each processing in the image processing unit 102 is controlled by a CPU (central processing unit) which is included in the image processing unit 102.

Figure 4A:
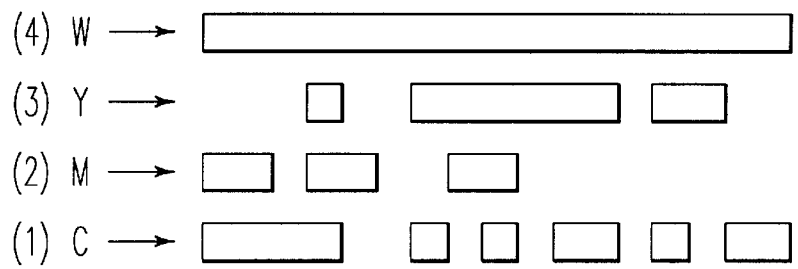
FIGS. 4A, 4B and 4C are diagrams of a transfer of an image according to the embodiment of the present invention.
Figure 4B:
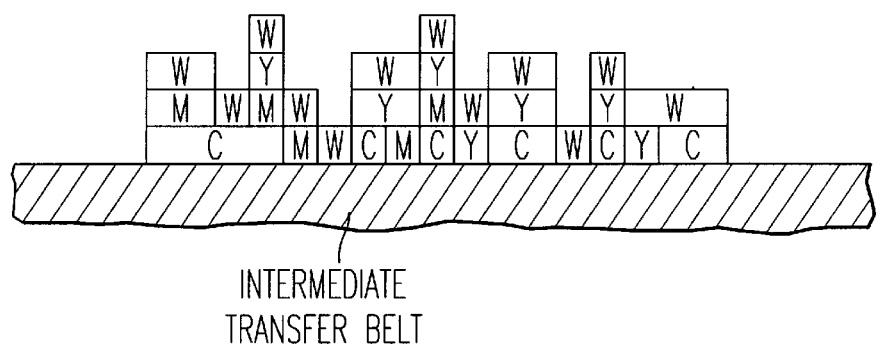
Figure 4C:
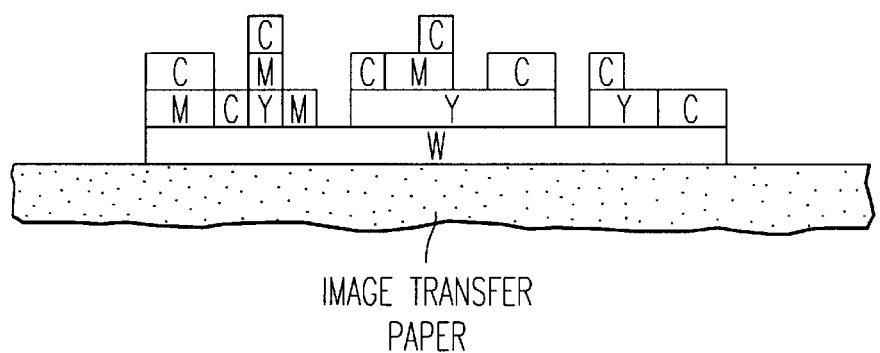

FIGS. 4A, 4B and 4C are diagrams showing a transfer of an image according to the embodiment of the present invention. In this embodiment, a primer image which is of a white color is formed on an image transfer paper to overlap the image according to the original image.

As mentioned above, each toner image of C, M, Y and W is formed on the intermediate transfer belt 19 by this sequence C, M, Y and W. FIG. 4A shows each toner image on the photoconductive drum 9 and FIG. 4B shows the toner images on the intermediate transfer belt 19. In FIG. 4B, a W toner image is formed at an uppermost position because the W toner image is formed last. Further, the W toner image is formed on all areas of the image according to the original image to overlap each of the images formed by C toner, M toner and Y toner, and the W image is formed of an almost uniform density.

The toner image on the intermediate transfer belt 19 of FIG. 4B is then transferred to the image transfer paper, or to a ceramic product, as shown in FIG. 4C. As a result of this operation, the W toner image is formed between the image transfer paper and each of the other color toner images of C, M, Y which form the image according to the original image.

With this operation, even if the image transfer paper or a ceramic product to which the image is transferred is not white, the color reproduction which is formed by C, M and Y toner image according to the original image is not lost because a white surface of uniform density is formed beneath the color reproduction of the C, M and Y toners. Moreover, a white color and near white color in the original image can be reproduced.

Figure 5A:
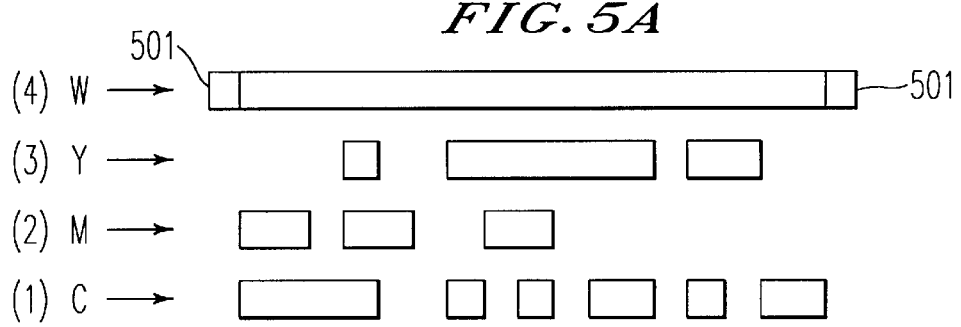
FIGS. 5A, 5B and 5C are diagrams of a transfer of an image according to another embodiment of the present invention.
Figure 5B:
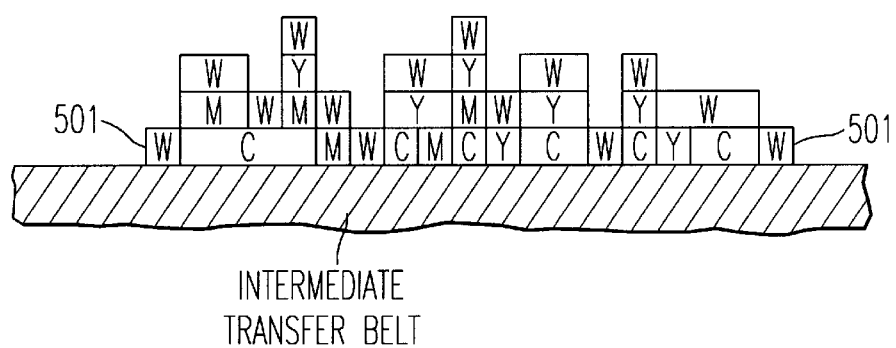
Figure 5C:
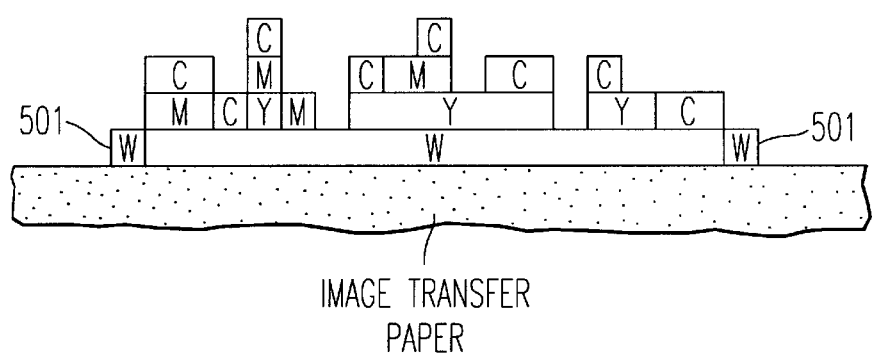
Figure 7A:
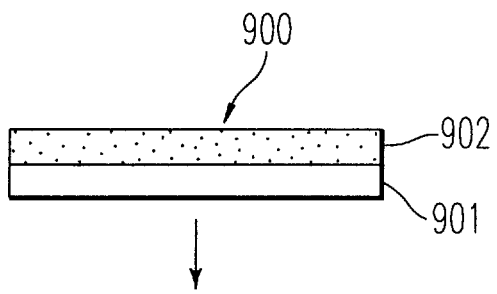
FIGS. 7A–7F are diagrams of a process of an image forming with an image transfer paper.
Figure 7B:
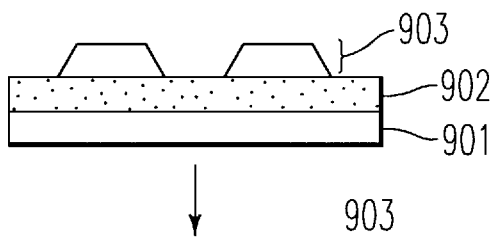
Figure 7C:
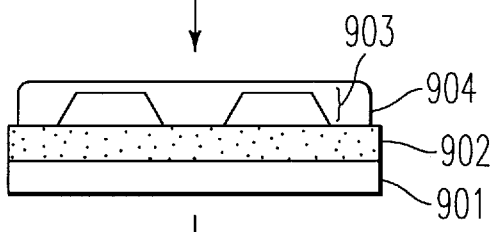
Figure 7D:
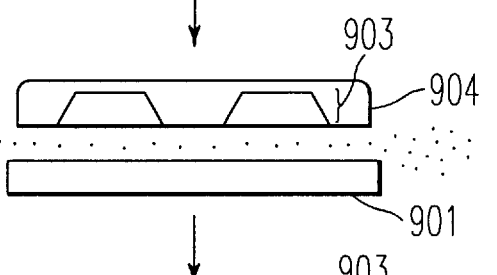
Figure 7E:
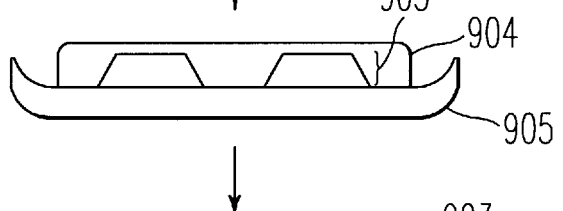
Figure 7F:
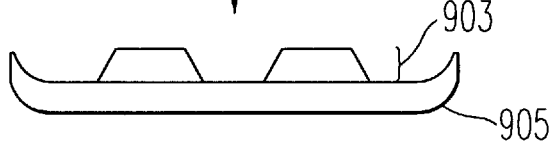

FIGS. 5A, 5B and 5C are diagrams of a transfer operation of an image according to another embodiment of the present invention. The point of difference between the embodiment in FIGS. 5A, 5B and 5C and the embodiment in FIGS. 4A, 4B and 4C is that in the embodiment in FIGS. 5A, 5B and 5C an extension area 501 is further included. The extension area 501 is a part of the primer image which is formed by white toner and results in the primer image of white toner being formed larger than the image which is formed by C, M or Y toner according to the original image. Because the primer image is larger than the image which is formed by the C, M and Y toners by virtue of extension area 501, when the image which is formed by the C, M and Y toners deviates from a correct position a little, the image which is formed by the C, M and Y toners is formed on the primer image, and therefore, the color reproduction which is formed by the C, M and Y toner image according to the original image is not lost. Moreover, because the primer image is shown between the image which is formed by the C, M and Y toners and a ceramics product after transferring, the image which is formed by the C, M and Y toner can be emphasized.

FIGS. 6A and 6B show an application of the embodiment of FIGS. 5A, 5B and 5C. In FIG. 6A, the extension area 501 of the primer image has a width of 1 mm. FIG. 6B is a graph of the distance from the edge of the image which is formed by the C, M and Y toners and the density of the primer image relationship. As shown in FIG. 6B, the primer image may have a density which decreases with the distance away from the C, M, Y toner image. Therefore, the extension area 501 of the primer image can be unobtrusive. This decreasing of the density of the primer image is executed by image processing, for example by dithering.

As shown in FIG. 1, the digital copier 100 according to the embodiment of the present invention includes an image display unit 104 and a coordinates inputting unit 105. These units allow for an image editing. For example, for an image cropping mode, the image display unit 104 displays the original image which is expanded in an image memory after reading by the image reading unit 101. An operator can input a desired area by the coordinates inputting unit 105. The image forming unit 103 forms the image of the input image area. In this forming for an image cropping mode, the image forming of the primer image is carried out according to the area input by the operator. Therefore, the primer image is formed on the input area or the input area and the extension area which is larger than the input area. The image display unit 104 and the coordinates inputting unit 105 can be embodied by known technologies.

As a toner which can be used in the above-disclosed embodiments of the present invention, a toner which includes a sintering coloring material and a binder resin (hereafter referred to as a ceramic toner) can be employed. The process of forming an image on a ceramic product is executed as shown in FIG. 7 as discussed above. In FIG. 7, an image 903 is formed by toner and a W toner image is formed contacting the water-soluble paste layer 902, and on the W toner image, C, M and Y toner images are formed.

The resin layer is formed by dipping the image transfer paper into liquid which includes a mixed powder in 5% polyvinyl alcohol. The mixed powder is made by mixing of the following components pulverized in a stamp mill and then mixed in a Henschel mixer:

|  | Parts by Weight |
| --- | --- |
| $Na_2O$ | 1 |
| $K_2O$ | 2 |
| CaO | 15 |
| PbO | 2 |
| $B_2O_3$ | 13 |
| $Al_2O_3$ | 2 |
| $SiO_2$ | 35 |

In the process of FIG. 7, after the base paper 901 is peeled off, the obtained resin layer 904 is applied to the surface of the ceramic product 905. In the other processes before the base paper 901 is peeled off, the image transfer paper 900 is applied to the surface of the ceramic product 905 with the resin layer 904 positioned between the surface of the ceramic product 905 and the image 903, and then the base paper 901 is peeled off and can be used. In this case, the white toner image is formed at the most upper portion on the image transfer paper for forming a white toner image as a primer coat. Further, an image is formed as a mirror image because an image is from side to side when transferring. These operations are carried out by changing the sequence of image forming and image mirroring by the image processing unit.

The ceramic toner includes a sintering coloring material and a binder resin, and desirably, includes a thermosetting material, a sintering material and a solvent. Examples of such a sintering coloring material for use in the present invention include metallic oxide, metallic oxide solid solution, composite metal oxide, composite metal oxide solid solution, silicate, silicate solid solution, metallic sulfide, selenium compound or selenium sulfide compound, metal powder, and metallic colloid. Specific examples of metal oxide include red oxide. Specific, examples of metallic oxide solid solution include manganese pink, chrome alumina green, chrome titanium yellow, vanadium tin yellow, Sb-containing tin oxide, and vanadium zirconium yellow. Specific, examples of composite metallic oxide include $(Zn, Co)O.Al_2O_3$, $ZnO.(Al, Cr)_2O_3$, $(Zn, Co)O.(Al, Cr)_2O_3$, $ZnO.(Al, Cr, Fe)_2O_3$, $MnO.Cr_2O_3$, $(Mn, Co)O.(Cr, Fe)_2O_3$ and $CuO.Cr_2O_3$. Specific examples of composite metallic oxide solid solution include antimony yellow. Specific examples of silicate are cobalt silicate [composition: cobalt olivine $2Co.SiO_2$], Nickel Green [compositions nickel olivine $2(Ni, Zn).SiO_2$] and uvarovite. Specific examples of silicate solid solution are chrome tin pink, vanadium blue, Turkish Blue, praseodymium yellow, and Coral Red. Specific examples of metallic sulfide include cadmium orange. Specific examples of selenium sulfide compound include cadmium red and selenium red.

Specific examples of a binder resin for use in the color toner include styrene and substituted styrene polymers, such as polystyrene, poly p-chlorostyrene, polyvinyl toluene; styrene copolymers such as styrene p-chlorostyrene copolymer, styrene-propylene copolymer, styrene-vinyltoluene copolymer, styrene-vinyl naphthalene copolymer, styrene-methyl acrylate copolymer, styrene-ethyl acrylate copolymer, styrenebutyl acrylate copolymer, styrene-octyl acrylate copolymer, styrene-methyl methacrylate copolymer, styrene-ethyl methacrylate copolymer, styrene-butyl methacrylate copolymer, styrene-methyl a-chloro methacrylate copolymer, styrene acrylonitrile copolymer, styrene-vinyl methyl ketone copolymer, styrene-butadiene copolymer, styrene isoprene copolymer, styrene-acrylonitrile-indene copolymer, styrene-maleic acid copolymer, and styrene-maleic acid ester copolymer; polymethyl methacrylate; polybutyl methacrylate; polyvinyl chloride; polyvinyl acetate; polyethylene; polypropylene; polyester; epoxy resin; epoxy polyol resin; polyurethane; polyamide; polyvinyl butyral; polyacrylic resin; rosin; modified rosin; terpene resin; aliphatic or aromatic petroleum resin; chlorinated paraffin; and paraffin wax. These binder resins can be used alone or in combination.

The above-mentioned color toner and thermofusible toner can be produced by any of conventional methods which are employed in electrophotography. To such toners, conventionally employed auxiliary agents or additives such as a charge controlling agent can be added. As such a charge controlling agent, there can be employed any of conventionally employed charge controlling agents, such as nigrosine dyes, triphenylmethane dyes, chromium-containing metal complex dyes, molybdic acid chelate dyes, rhodamine dyes, alkoxy amine, quaternary ammonium salt (including fluorine modified quaternary ammonium salt), alkyl amide, phosphorus, phosphorus compound, tungsten, tungsten compound, fluorine-based activating agent, metal salicylate, and salicylic acid derivative metal salt. These charge controlling agents can be employed alone or in combination. The amount of such a charge controlling agent to be used in the toner depends upon the kind of a binder resin to be used in combination with the charge controlling agent, the presence or absence of an additive which is added to the toner when necessary, and also upon the method of producing the toner, including a dispersion method employed therein, and therefore cannot be determined unconditionally.

However, it is preferable that the amount of such a charge controlling agent be 0.1 to 10 parts by weight, more preferably 2 to 5 parts by weight, to 100 parts by weight of a binder resin to be used in combination with the charge controlling agent, in order to obtain an appropriate charge quantity and sufficient chargeability for the toner for use in practice. To be more specific, when the amount of the charge controlling agent is less than 0.1 parts by weight to 100 parts by weight of a binder resin, the charge quantity of the toner tends to be insufficient, while when the amount of the charge controlling agent exceeds 10 parts by weight, the electrostatic attraction between a carrier and the toner tends to increase excessively so that the fluidity of the developer composed of the carrier and the toner is decreased and the image density tends to be decreased. Examples of other additives that can be added to the toner include colloidal silica; hydrophobic silica; metal salts of aliphatic acids such as zinc stearate and aluminum stearate; metallic oxides such as titanium oxide, aluminum oxide, tin oxide, and antimony oxide; and fluoropolymer.

The toner in the embodiment may be made, as examples by the following steps.

Production Example 1
[Production of cyan toner]

A mixture of the following components was mixed in a mixer, and fused and kneaded in a three-roll mill through 3 paths:

| | Parts by Weight |
|---|---|
| Polyester resin | 600 |
| (Acid value = 3, Hydroxyl value = 25, Mn = 45000, Mw/Mn = 4.0. Tg = 60° C.) | |
| Vanadium Blue | 100 |
| Mixed powder | 300 |
| Zinc salicylate derivative | 2 |
| (Trademark "Bontron E84" made by Orient Chemical industries, Ltd.) | |

The above kneaded mixture was cooled, pulverized by a pulverizer, finely divided by a jet mill, and classified, whereby a toner with a volume mean diameter of 7.5 μm was obtained.

To 100 parts by weight of this toner, 0.5 parts by weight of a commercially hydrophobic silica (Trademark "R972" made by Nippon Aerosil Co., Ltd.) was added, and the mixture was mixed in a mixer, whereby cyan toner was prepared.

Production Example 2
[Production of magenta toner]

A mixture of the following components was mixed in a mixer, and fused and kneaded in a three-roll mill through 3 paths:

| | Parts by Weight |
|---|---|
| Polyester resin | 600 |
| (Acid value = 3, Hydroxyl value = 25, Mn = 45000, Mw/Mn = 4.0, Tg = 60° C.) | |
| $ZnO.(Al, Cr)_2O_3$ | 100 |
| Mixed powder | 300 |
| Zinc salicylate derivative | 2 |
| (Trademark "Bontron E84" made by Orient Chemical industries, Ltd.) | |

The above kneaded mixture was cooled, pulverized by a pulverizer, finely divided by a jet mill, and classified, whereby a toner with a volume mean diameter of 7.5 μm was obtained.

To 100 parts by weight of this toner, 0.5 parts by weight of a commercially hydrophobic silica (Trademark "R972" made by Nippon Aerosil Co., Ltd.) was added, and the mixture was mixed in a mixer, whereby magenta toner was prepared.

Production Example 3
[Production of yellow toner]

A mixture of the following components was mixed in a mixer, and fused and kneaded in a three-roll mill through 3 paths:

| | Parts by Weight |
|---|---|
| Polyester resin | 600 |
| (Acid value = 3, Hydroxyl value = 25, Mn = 45000, Mw/Mn = 4.0, Tg = 60° C.) | |
| Chromium Titanium Yellow | 100 |
| Mixed powder | 300 |
| Zinc salicylate derivative | 2 |
| (Trademark "Bontron E84" made by Orient Chemical industries, Ltd.) | |

The above kneaded mixture was cooled, pulverized by a pulverizer, finely divided by a jet mill, and classified, whereby a toner with a volume mean diameter of 7.5 μm was obtained.

To 100 parts by weight of this toner, 0.5 parts by weight of a commercially hydrophobic silica (Trademark "R972" made by Nippon Aerosil Co., Ltd.) was added, and the mixture was mixed in a mixer, whereby yellow toner was prepared.

Production Example 4-1
[Production of white toner (1)]

A mixture of the following components was mixed in a mixer, and fused and kneaded in a three-roll mill through 3 paths:

| | Parts by Weight |
|---|---|
| Polyester resin | 600 |
| (Acid value = 3, Hydroxyl value = 25, Mn = 45000, Mw/Mn = 4.0, Tg = 60° C.) | |
| $TiO_2$ | 100 |
| Mixed powder | 300 |
| Zinc salicylate derivative | 2 |
| (Trademark "Bontron E84" made by Orient Chemical industries. Ltd.) | |

The above kneaded mixture was cooled, pulverized by a pulverizer, finely divided by a jet mill, and classified whereby a toner with a volume mean diameter of 7.5 μm was obtained.

To 100 parts by weight of this toner, 0.5 parts by weight of a commercially hydrophobic silica (Trademark "R972" made by Nippon Aerosil Co., Ltd.) was added, and the mixture was mixed in a mixer, whereby white toner was prepared.

Production Example 4-2
[Production of white toner (2)]

A mixture of the following components was mixed in a mixer, and fused and kneaded in a three-roll mill through 3 paths:

| | Parts by Weight |
|---|---|
| Polyester resin | 600 |
| (Acid value = 3, Hydroxyl value = 25, Mn = 45000, Mw/Mn = 4.0, Tg = 60° C.) | |
| ZnO | 100 |
| Mixed powder | 300 |
| Zinc salicylate derivative | 2 |
| (Trademark "Bontron E84" made by Orient Chemical industries, Ltd.) | |

The above kneaded mixture was cooled, pulverized by a pulverizer, finely divided by a jet mill, and classified, whereby a toner with a volume mean diameter of 7.5 μm was obtained.

To 100 parts by weight of this toner, 0.5 parts by weight of a commercially hydrophobic, silica (Trademark "R972" made by Nippon Aerosil Co., Ltd.) was added, and the mixture was mixed in a mixer, whereby white toner was prepared.

Production Example 4-3
[Production of white toner (3)]

A mixture of the following components was mixed in a mixer, and fused and kneaded in a three-roll mill through 3 paths:

| | Parts by Weight |
|---|---|
| Polyester resin (Acid value = 3, Hydroxyl value = 25, Mn = 45000, Mw/Mn = 4.0, Tg = 60° C.) | 600 |
| Zn + BaSO$_4$ | 100 |
| Mixed powder | 300 |
| Zinc salicylate derivative (Trademark "Bontron E84" made by Orient Chemical industries, Ltd.) | 2 |

The above kneaded mixture was cooled, pulverized by a pulverizer, finely divided by a jet mill, and classified, whereby a toner with a volume mean diameter of 7.5 µm was obtained.

To 100 parts by weight of this toner, 0.5 parts by weight of a commercially hydrophobic silica (Trademark "R972" made by Nippon Aerosil Co., Ltd.) was added, and the mixture was mixed in a mixer, whereby white toner was prepared. In these productions of white toner, "Production of white toner (1)" provided the best production.

In this embodiment, a primer image is formed by white toner, however, another color toner can be used. When the primer image is formed by another color toner, the image processing unit calculates the densities of the C, M and Y toners according to the other color primer image.

In this embodiment, an image is formed by three toner colors, C, M and Y, but image forming by four colors, adding black to these three colors, can also be used. In this four color image forming, a developing unit for black toner is added. Moreover, gold and/or silver toner can be used. For using gold and/or silver toner, these toner images are formed at uppermost positions.

In this embodiment, an image forming is carried out according to the image which is read by the image-reading unit 101, however, other input image can be used, for example, an image data input from a host computer.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional components, as will be readily apparent to those skilled in the art.

This application is based on Japanese patent application 8-071484 filed in the Japanese Patent Office on Feb. 29, 1996, the entire contents of which are hereby incorporated by reference.

What is claimed as new and desired to be secured by Letters Patent of the United States is:

1. A method of forming an image on an image transfer medium, comprising the steps of:
   forming an image according to image data on the image transfer medium;
   forming one color primer image by one color primer on the image transfer medium at least on top of a first area of said image according to the image data; and
   transferring the one color primer image and image according to the image data to a recording medium such that the one color primer contacts the recording medium.

2. The method as claimed in claim 1, wherein said one color primer is formed of a white color.

3. The method as claimed in claim 1, wherein said one color primer is formed on a second area which is larger than the first area.

4. The method as claimed in claim 3, wherein in said second area a density of said one color primer changes with an increasing distance from said first area.

5. A method of forming an image on an image transfer medium, comprising the steps of:
   forming a toner image, by toner which includes at least a first sintering coloring material and a first binder resin, according to image data on the image transfer medium;
   forming one color primer image, by one color primer toner which includes at least a second sintering coloring material and a second binder resin, on the image transfer medium at least on top of a first area of said image according to the image data; and
   transferring the one color primer image and image according to the image data to a recording medium such that the one color primer contracts the recording medium.

6. The method as claimed in claim 5, wherein said one color primer toner is formed of a white color.

7. The method as claimed in claim 5, wherein said one color primer toner is formed on a second area which is larger than the first area.

8. The method as claimed in claim 7, wherein in said second area a density of said one color primer toner changes with an increasing distance from said first area.

9. A method of forming an image using a transfer medium, comprising the steps of:
   forming an image according to image data on the image transfer medium;
   forming a primer image by one color primer on the image transfer medium at least in a first area of said image according to the image data;
   separating said image according to the image data and said primer image from said image transfer medium;
   fixing said image according to the image data and said primer image on a surface of a transferred object with said primer image contacting the surface of the transferred object.

10. The method as claimed in claim 9, wherein said one color primer is formed of a white color.

11. The method as claimed in claim 9, wherein said one color primer is formed on a second area which is larger than the first area.

12. The method as claimed in claim 11, wherein in said second area a density of said one color primer changes with an increasing distance from said first area.

13. A method of forming an image using a transfer medium, comprising the steps of:
   forming a toner image, by toner which includes at least a first sintering coloring material and a first binder resin, according to image data on the image transfer medium;
   forming one color primer image, by one color primer toner which includes at least a second sintering coloring material and a second binder resin, on the image transfer medium at least in a first area of the image according to the image data;
   separating said image according to the image data and said primer image from said image transfer medium; and fixing said image according to the image data and said primer image on a surface of a transferred object in which said primer image is positioned between the surface of the transferred object and said image according to the image data.

14. The method as claimed in claim 13, wherein said one color primer toner is formed of a white color.

15. The method as claimed in claim 13, wherein said one color primer is formed on a second area which is larger than the first area.

16. The method as claimed in claim 15, wherein in said second area a density of the one color primer toner changes with an increasing distance from said first area.

17. An image forming apparatus for forming an image on an image transfer medium, comprising:

inputting means for inputting image data;

image processing means for generating one color primer image data at least on an area of the input image data from said inputting means;

image forming means for forming an image on the image transfer medium according to the input image data from said inputting means and forming a primer image on top of the image according to the image data on the image transfer medium according to the one color primer image data from said image processing means, and transferring the primer image and image according to the image data to a recording medium such that the primer contacts the recording medium.

18. An image forming apparatus for forming an image on an image transfer medium, comprising:

inputting means for inputting image data;

image processing means for generating one color primer image data at least of a first area of the input image data from said inputting means;

image forming means for forming an image according to the input image data from said inputting means and forming a primer image according to the one color primer image data from said image processing means on top of the image according to the image data on the image transfer medium by one color primer toner which includes at least a sintering coloring material and a binder resin, and transferring the primer image and image according to the image data to a recording medium such that the one color primer toner contacts the recording medium.

19. An image forming apparatus for forming an image on an image transfer medium as claimed in claim 18, wherein said one color primer toner is formed of a white color.

20. An image forming apparatus for forming an image on an image transfer medium as claimed in claim 18, wherein said primer image is formed on a second area which is larger than the first area.

21. An image forming apparatus for forming an image on an image transfer medium as claimed in claim 20, wherein in said second area a density of the primer image changes with an increasing distance from said first area.

22. An image forming apparatus for forming an image on an image transfer medium, comprising:

an image inputting unit for inputting image data;

an image processing unit for generating one color primer image data at least on an area of the input image data from said image inputting unit;

an image forming unit forming an image on the image transfer medium according to the input image data from said inputting unit and forming a primer image on top of the image according to the image data on the image transfer medium according to the primer image data from said image processing unit, and transferring the primer image and image according to the image data to a recording medium such that the primer contacts the recording medium.

23. A method of forming an image on an image transfer medium, comprising the steps of:

forming an image according to image data on the image transfer medium;

forming one color primer image by one color primer on the image transfer medium at least in a first area of said image and a second area which is larger than the first area according to the image data;

wherein in said second area a density of said one color primer changes with an increasing distance from said first area.

24. The method as claimed in claim 23, wherein said one color primer is formed of a white color.

25. A method of forming an image on an image transfer medium, comprising the steps of:

forming a toner image, by toner which includes at least a first sintering coloring material and a first binder resin, according to image data on the image transfer medium;

forming one color primer image, by one color primer toner which includes at least a second sintering coloring material and a second binder resin, on the image transfer medium at least in a first area of said image and a second area which is larger than the first area according to the image data;

wherein in said second area a density of said one color primer toner changes with an increasing distance from said first area.

26. The method as claimed in claim 25, wherein said one color primer toner is formed of a white color.

27. An image forming apparatus for forming an image on an image transfer medium, comprising:

inputting means for inputting image data;

image processing means for generating one color primer image data at least on a first area and a second area which is larger than the first area of the input image data from said inputting means;

image forming means for forming an image according to the input image data from said inputting means and forming a primer image according to the one color primer image data from said image processing means on the image transfer medium by one color primer toner which includes at least a sintering coloring material and a binder resin;

wherein in said second area a density of the primer image changes with an increasing distance from said first area.

28. An image forming apparatus for forming an image on an image transfer medium as claimed in claim 27, wherein said one color primer toner is formed of a white color.

* * * * *